(No Model.)
W. G. RENDALL.
TREE FELLER AND PILE CUTTER.
No. 337,018. Patented Mar. 2, 1886.
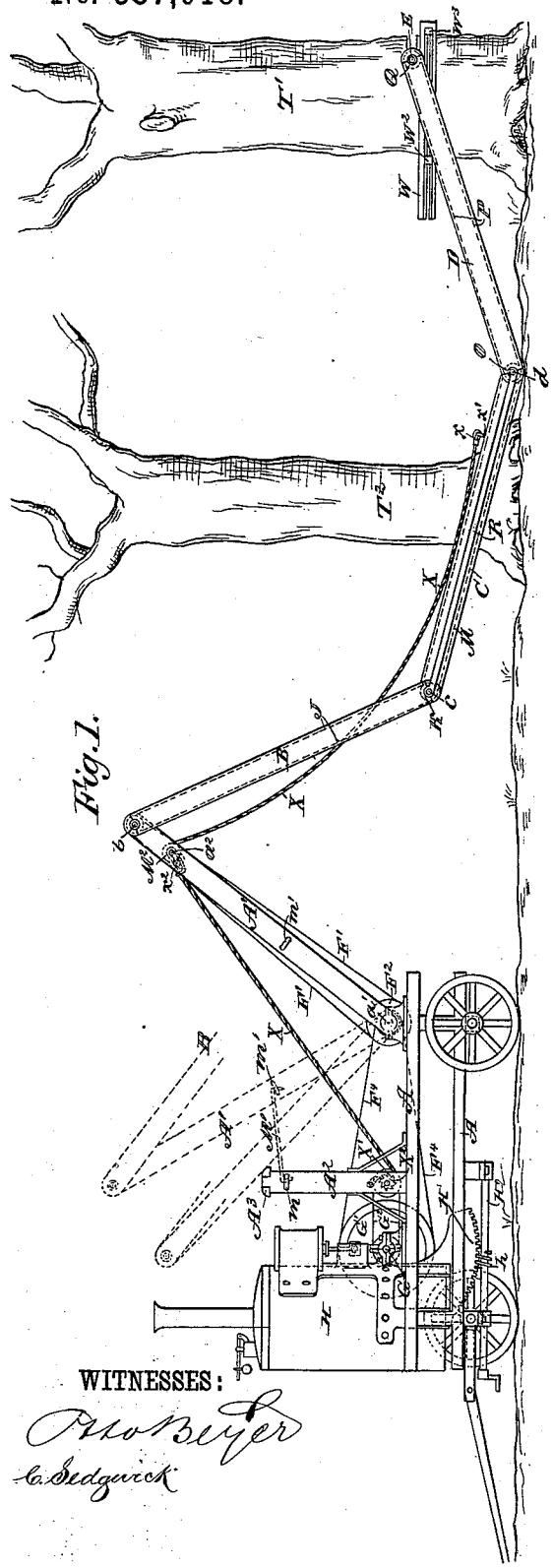
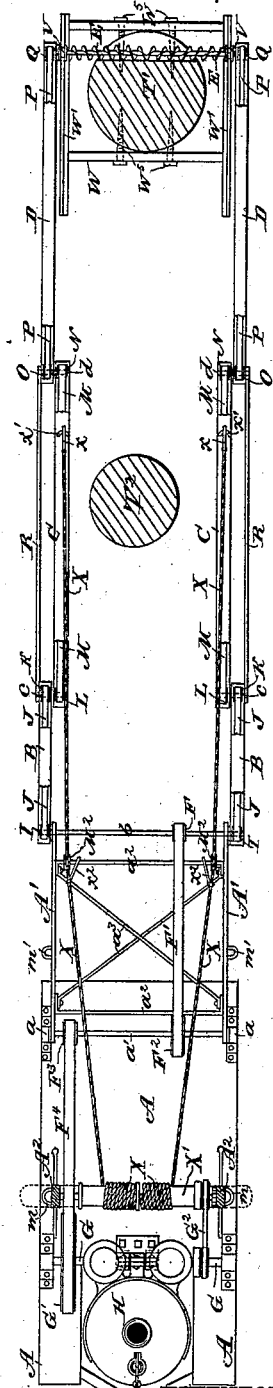
WITNESSES:
INVENTOR:
W. G. Rendall
BY Munn & Co
ATTORNEYS.

(No Model.)
W. G. RENDALL.
TREE FELLER AND PILE CUTTER.
No. 337,018. Patented Mar. 2, 1886.
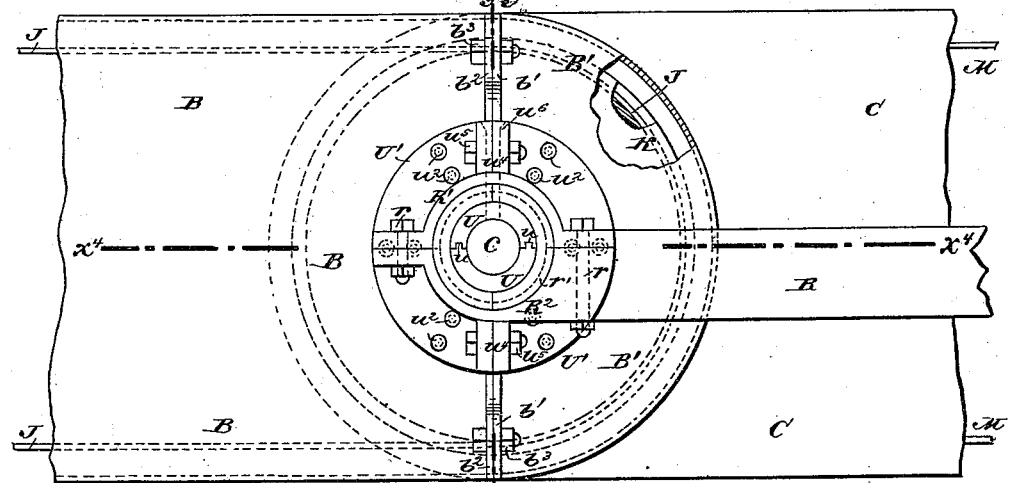
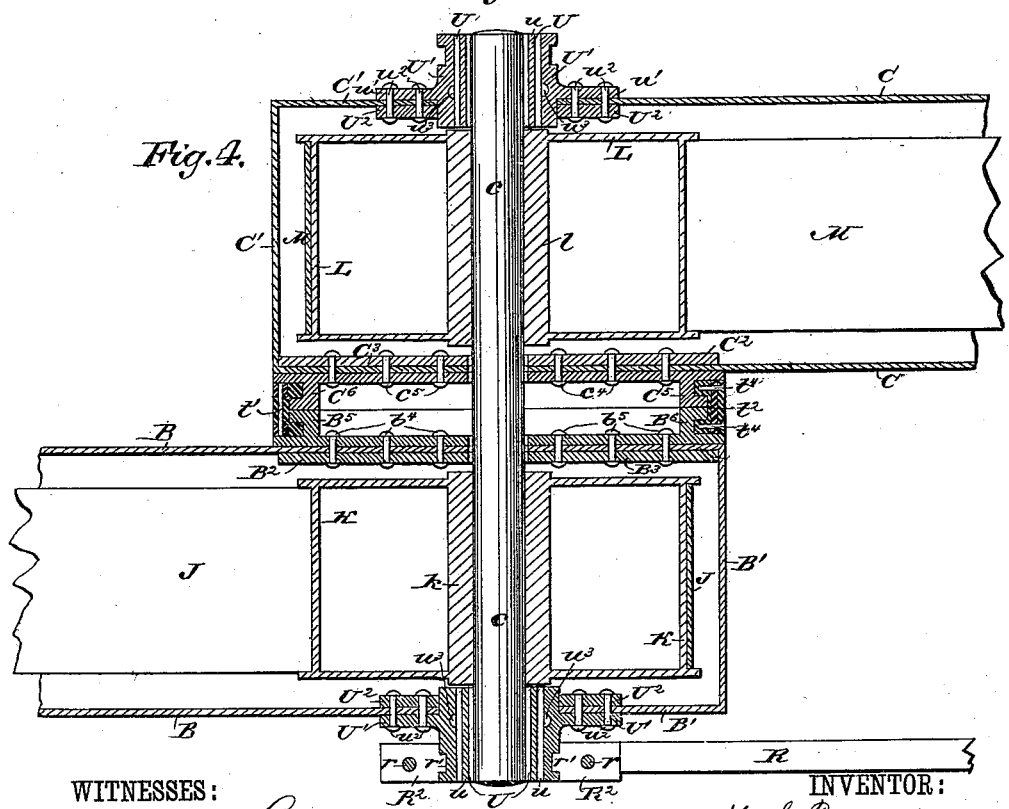
WITNESSES:
INVENTOR:
W. G. Rendall
BY Munn & Co
ATTORNEYS.

(No Model.) 4 Sheets—Sheet 3.

W. G. RENDALL.
TREE FELLER AND PILE CUTTER.

No. 337,018. Patented Mar. 2, 1886.

WITNESSES:
Otto Berger
C. Sedgwick

INVENTOR:
W. G. Rendall
BY Munn & Co.
ATTORNEYS.

(No Model.) 4 Sheets—Sheet 4.

W. G. RENDALL.
TREE FELLER AND PILE CUTTER.

No. 337,018. Patented Mar. 2, 1886.

WITNESSES:

INVENTOR:
W. G. Rendall
BY Munn & Co
ATTORNEYS.

UNITED STATES PATENT OFFICE.

WILLIAM G. RENDALL, OF PORTLAND, OREGON.

TREE-FELLER AND PILE-CUTTER.

SPECIFICATION forming part of Letters Patent No. 337,018, dated March 2, 1886.

Application filed June 5, 1885. Serial No. 167,801. (No model.)

*To all whom it may concern:*

Be it known that I, WILLIAM G. RENDALL, of Portland, in the county of Multnomah and State of Oregon, have invented a new and Improved Tree-Feller and Pile-Cutter, of which the following is a full, clear, and exact description.

My invention relates to machinery for felling trees and cutting off driven piles, and has for its object to economize time and labor in accomplishing this work.

The invention consists in various novel constructions and combination of parts of the tree-feller and pile-cutter, which comprises a rotatable cutter mounted at the extremities of the last pair of a series of arms which are pivoted to each other and to a frame mounted on a truck or float or other support, so that power may be applied by a system of pulleys and belts journaled to and ranging along the arms to rotate the cutter from an engine mounted on the truck or support, or from a separate engine set up adjacent to said support. A windlass and ropes adapted to be connected to the arms and the supporting-frame are employed for feeding the cutter-head to its work, and also for folding the arms together on their support, and a frame is fixed to the tree or pile to be cut for guiding the cutter to and through the tree or pile, all as hereinafter fully described and claimed.

Reference is to be had to the accompanying drawings, forming part of this specification, in which similar letters of reference indicate corresponding parts in all the figures.

Figure 5:
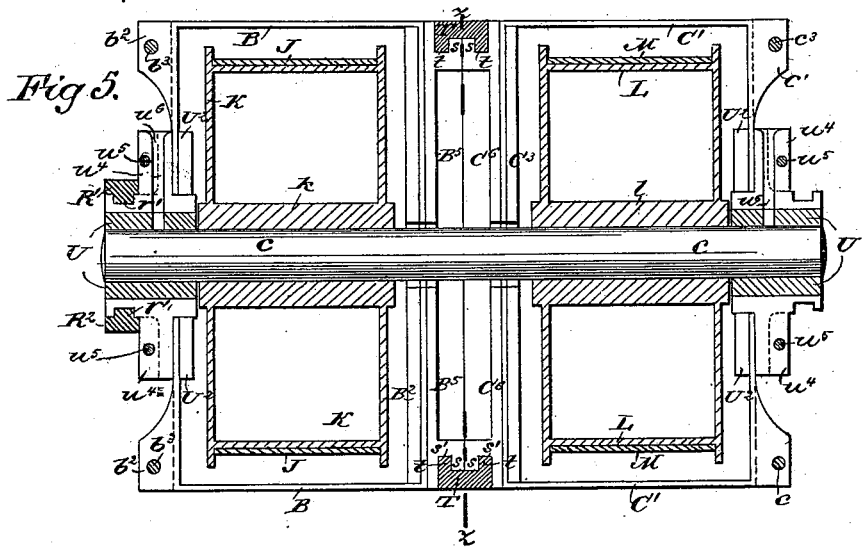
Figure 7:
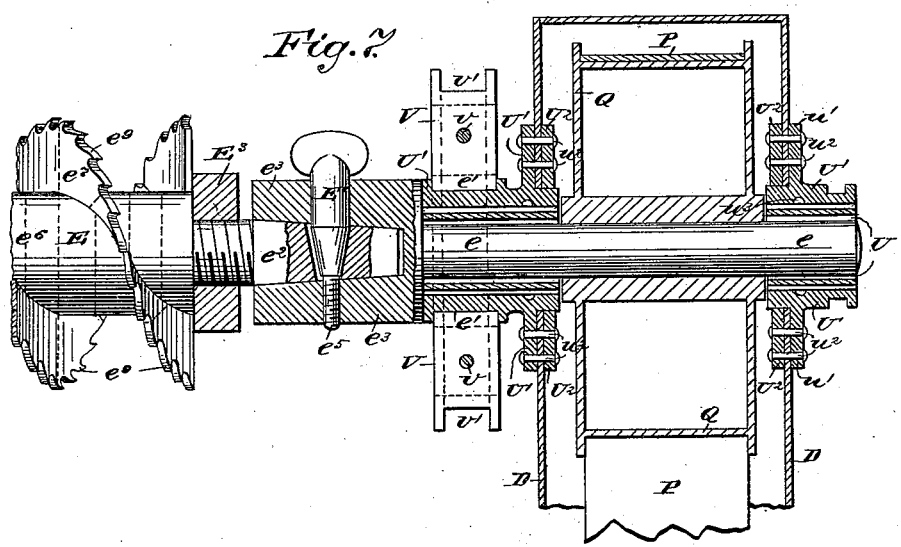
Figure 6:
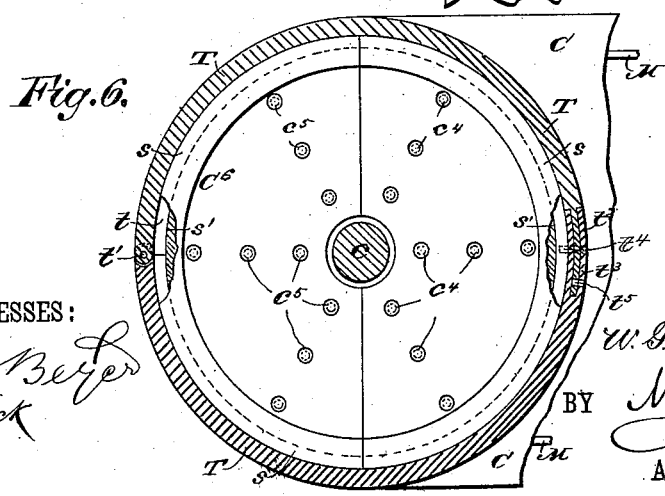

Figure 1 is a side elevation of my improved machine, with the engine combined with the truck, and as applied to use in felling trees. Fig. 2 is a plan view, with the trees in section and with parts broken away. Fig. 3 is an enlarged side elevation at the joint between two of the hinged arms of the machine. Fig. 4 is a sectional plan view taken on the line $x^4 x^4$, Fig. 3. Fig. 5 is a transverse vertical sectional elevation taken on the line $y y$, Fig. 3. Fig. 6 is a section across the axis of the joint and on the line $z z$, Fig. 5. Fig. 7 is a sectional plan view through the extremity of one of the side arms in which the cutter is journaled, and showing one end of the cutter. Fig. 8 is a side elevation of a truck as arranged for feeding the cutter to its work by hand-power, and to operate the cutter by an engine or motor detached from the truck. Fig. 9 is a plan view thereof. Fig. 10 is a perspective view of the cutter supporting frame partly disjointed. Fig. 11 is a perspective view of the apparatus as adapted for use with a pile-driver or its derrick for cutting off the ends of the driven piles, and Fig. 12 is a plan view of the cutter-head.

The letter A indicates a truck on which is mounted, by hollow hinge-joints or suitable swiveling connections at $a$, the frame A', across the lower end of which runs a driving-shaft, $a'$, which passes loosely through the hinge joints or connections at $a$, and is journaled in suitable bearings or boxes on the truck or frame, which frame A' consists of side bars connected by cross-bars $a^2$, and it may be also the diagonal braces $a^3$. (See Fig. 2.)

Across the head of the frame A' is journaled a shaft, $b$, on which at opposite ends is hung a pair of arms, B B, to the outer ends of which are pivoted, by short shafts $c c$, a second pair of arms, C C, to the outer ends of which are pivoted in turn by short shafts $d d$ a third pair of arms, D D, to the outer ends of which the cutter-head E is journaled by its end shaft-connections, $e e$. The cutter-head may be journaled at the outer ends of the first pair of arms, B B, or the second pair of arms, C C, or more than three pairs of connected arms may be employed, with the cutter-head journaled at the outer ends of the last pair of arms, the number of arms depending on the number of trees or piles it is desired to fell or cut without changing the position of the supporting-truck A, as hereinafter more fully explained.

The shaft $b$ has a pulley, F, from which a belt, F', runs to and around a pulley, F², on shaft $a'$, which shaft also has a pulley, F³, to which a belt, F⁴, runs from a power-transmitting pulley, G', on the engine-shaft G, when the power for driving the cutter-head and adjusting the arms is to be taken from an engine, H, mounted on the truck A, as in Figs. 1 and 2.

I connect the self-contained engine H to the truck A by a strong hinge-joint, through which the engine driving-shaft G passes, so that when the truck stands out of level on sloping ground the engine and boiler may be brought to an upright position by swinging it on the hinge, say, by means of a segmental rack, H, fixed to the engine, being moved either way by means of a worm, $h$, on a worm-shaft, $H^2$, journaled to the truck, (see Fig. 1;) but any other method of adjusting the engine on its hinge-joint and holding it so as to maintain proper water-level in the boiler may be employed.

When the engine is not mounted on the truck A, as in Figs. 8 and 9, I will connect short shafts $f$ by universal joints $f'$ with the opposite ends of the shaft $a'$, and the outer ends of shafts $f$ will be supported by a suitable bearing-block, $f^2$, on the semicircular plate or bar $f^3$, fixed to truck A, and suitable fastenings will be provided to hold the shafts $f$ at any desired or necessary angle, so that a driving-belt may be run from a pulley on a separate engine onto either of the pulleys $f^4$ $f^4$ on shafts $f$ $f$. This arrangement of the truck and shafts and pulleys allows the truck to be shifted in position, so as to locate the pivoted arms, carrying the cutter E, in different positions for operating the cutter on the greatest number of trees or piles to be cut without requiring the heavy engine by which the machinery is driven to be shifted in position so often, thus saving time and labor in the work.

The ends of shaft $b$ have fixed to them the pulleys I I, over which belts J J pass to pulleys K K, journaled at the lower or outer ends of arms B B on the shafts $c$ $c$, which shafts also carry at the one ends of arms C the pulleys L L, over which the belts M M pass to pulleys N N on the short shafts $d$ $d$, on which are mounted also at the back or inner ends of the arms D D the pulleys O O, over which pass belts P P, which lead along arms D D to the pulleys Q Q on the short shafts $e$ $e$, to which the cutter E is fixed, as presently explained.

To prevent undue side strain on the short shafts $c$ $c$ $d$ $d$ by the pull of the driving-belts J M P, I connect said shafts $c$ $d$ at each side of the pivoted arm-frame by a rod, R, as in Figs. 1 and 2, and in the detailed views, Figs. 3 and 4, hereinafter more particularly described.

The arms B C D may be solid planks or timbers as light as may be, and the driving-belts J M P may run at the side or along the upper and lower faces of the timbers; but this while felling trees would expose the running belts to entanglement with brushwood and leaves or undergrowth of various kinds which would be likely to clog the belts and break the machinery, or interfere seriously with its proper action, and to avoid these difficulties I have made the arms B C D hollow or tubular, so that the belts J M P will run inside of the arms, which I prefer to make of sheet metal having requisite stiffness and fitted with re-enforcing plates at the ends forming the pivot-joints of the arms with each other, and the supports to the boxes or bearings of the shaft $c$ $d$ in the arms, as next described and with special reference to Figs. 3, 4, 5, and 6 of the drawings, which represent the joint between the arms B C with the adjacent portion of the brace or tie rod R.

The body or main portions of the sheet-metal arms B C extend up to the center of the shaft $c$, where they are cut away for the passage of the shaft, and to admit the shaft-boxes and the extremities of the arms are in the form of semicircular sheet-metal caps or boxes B' C', which at the outer side faces of the arms have lugs $b'$ $c'$, respectively, which are fastened to lugs $b^2$ $c^2$ on the bodies of the arms by bolts or screws, as at $b^3$ $c^3$, the lugs $c^2$ on the body part of arm C not being shown, but they are similar to the lugs $b^2$ on the main body of arm B, and join with the lugs $c'$ on the end cap, C', as will readily be understood.

At the inside faces of the ends of the main parts of arms B C are fixed by rivets $b^4$ $c^4$ the semicircular metal re-enforcing plates $B^2$ $C^2$, and similar re-enforcing plates, $B^3$ $C^3$, are secured to the inner faces of the inner sides of the caps B' C' by rivets $b^5$ $c^5$, and the rivets $b^4$ $c^4$ also bind to the outer faces of the main parts of arms B C the semicircular swivel-plates $B^5$ $C^5$, which face the semicircular swivel-plates $B^6$ $C^6$, secured by the rivets $b^5$ $c^5$ to the caps B' C' of the arms B C, respectively. The plates $B^5$ $C^5$ $B^6$ $C^6$ are formed at their outer peripheral edges with a tongue, as at $s$, which overhangs a groove, $s'$, so that when the plates come together face to face, as in Figs. 4 and 5, a strap, T, having tongues $t$ $t$ entering the grooves $s'$ of all four of the plates, will bind the plates and consequently the arms B C to each other, and make a complete swivel-joint of the arms with each other. I prefer to make the strap T in two sections, hinged together at $t'$, and with a tongue, $t^2$, on one part entering a groove, $t^3$, in the other part, pins or screws at $t^4$, passed through the tongue, serving to bind the strap T in place around the joint, and at $t^5$, Fig. 6, may be formed an aperture in the outer part of the grooved end of the ring about opposite an aperture in the tongue $t^2$, so that an awl or other instrument may be inserted in the tongue to draw the joint of the strap T up tightly prior to inserting the fastenings $t^4$.

The end bearings of the shaft $c$ consist of the anti-friction journal-brasses U, which are made in halves and are tongued and grooved together, as at $u$, Fig. 3, so as to inclose the ends of the shaft, and these brasses U are held by the boxes U', also made in halves and having face-flanges $u'$, which are secured by rivets or bolts $u^2$ to the body and cap portions of the arms, semicircular re-enforcing plates $U^2$ preferably being used at the inner faces of the arms and caps and held by the same fastenings, $u^2$. The brasses U have one or more lugs or projections, $u^3$, upon them, which enter corresponding recesses in the inner faces of the boxes U', to prevent turning and endwise shifting of the brasses when they and the half-boxes are placed around the shaft and are secured by the fastenings $u^2$. The half-boxes U' have face-lugs $u^4$, which are bolted together at $u^5$, and in the opposing faces of the upper lugs, $u^4$, grooves are formed, which, when the lugs are in contact, form an oil-hole, as at $w^6$, Fig. 5, and in dotted lines in Fig. 3, through which oil may be passed into and through an oilway in the brasses to the bearings of the shaft.

It will be understood that the semicircular swivel-joint sections and boxes are first secured to the body portions and caps of the arms B C, and the shaft $c$, with its pulleys K L made fast to it by their hubs $k$ $l$, then is adjusted in the brasses, and the caps are put on the arms, and, finally, the strap T is applied to complete the joint, the operation being very simple and quickly performed, and the parts may as easily be dismembered at any time.

The connections of the arms C D and shaft $d$ and the arrangement of the belt-pulleys N O therewith, and also the joints of the arms B B with the side bars of the frame A', will be made with swivel-plate and strap connections substantially similar to those above described for the arms B C, shaft $c$, and pulleys K L, and at the cutter end of the complete connected arm-frame, where the pulleys Q are journaled, the arms D will be fitted with semicircular end caps and half-boxes U, with brasses U' at opposite sides of the arms, and in which boxes the shafts $e$ find bearings, as shown in Fig. 7; hence further detailed description of these connections is unnecessary.

The tie or brace bar R is connected with or at the shafts $c$ $d$ by means of half-boxes R', fixed to the ends of the bar, and loose half-boxes $R^2$, which are fixed to boxes R' by bolts $r$, so that the boxes R' $R^2$ encircle the hub of the joined half-boxes $U^2$, and I provide the half-boxes R' $R^2$ with a tongue, $r'$, which enters a corresponding groove around the hub of boxes $U^2$, to prevent disengagement of the tie-bar from the boxes of the shafts $c$ $d$. (See Figs. 3, 4, and 5.)

When the metal of the arms B C D is heavy or strong enough, the re-enforcing plates $B^2$, $B^3$, $C^2$, $C^3$, and $U^2$ may be dispensed with; but as lightness of the arms is an object desired, these plates will preferably be employed.

The boxes U' at the inner ends of the cutter-shafts $e$ $e$ are prolonged and provided with an annular recess, as at $e'$, Fig. 7, in which is mounted on each box a roller or wheel, V, which is made in halves held together by bolts $v$, and has a peripheral groove at $v'$, so that a roller, V, at each end of the cutter E will run on the tongued upper edges of the side bars, W' W', of a frame, W, which is secured to the tree or pile, so as to guide the cutter, as presently explained.

To support the cutter E by the shafts $e$ $e$, the opposite tapering squared ends, $e^2$, of the cutter-shaft enter correspondingly-shaped sockets formed in enlargements or heads $e^3$ of the shafts $e$ $e$, and a pin, E', is passed transversely through the head $e^3$, and has a tapering portion, $e^4$, which enters a tapering bore made through and across the end $e^2$ of the cutter, and also has a threaded end, $e^5$, which screws into the head $e^3$, so that when the screw-pin E' is turned in the tapering portion $e^4$ will seat the end of the cutter firmly in its socket, to prevent chattering of the cutter when at work.

I show the end $e^2$ of the cutter screw-threaded and provided with a nut, $E^3$, to illustrate how sections of which the cutter may be composed, as indicated in dotted lines in Fig. 7, may be bound firmly together by nuts $E^3$ at opposite ends of the cutter.

As shown most clearly in Fig. 12, I prefer to make the cutter E with a central shaft, $e^6$, and oppositely-arranged or right and left handed spirals $e^7$ $e^8$, fixed thereto, and having peripheral teeth $e^9$, the meeting ends of the spirals about at the center of the cutter forming a cutting-tooth, $e^{10}$. The spirals have cutting-teeth $e^9$ throughout their lengths, which teeth preferably are set to one side for better clearance of the cutter while at work. The cutter may be made with either single or double spirals, as preferred.

The form of cutter with oppositely-arranged spirals is preferred for cutting large trees or piles, as it discharges the chips or cuttings both ways and more readily clears itself; but for use on trees or piles of small diameter a cutter having a toothed spiral running either right or left handed for its entire length may be employed effectively.

As best seen in Fig. 10, the cutter-guide frame W consists of opposite side bars, W' W', and front and rear bars, $W^2$ $W^3$, respectively. The side bars, W', each have slots $w$ $w'$, in which fit the necks $w^2$ of ⊢-shaped projections formed on or fixed to the ends of the bars $W^2$ $W^3$, the heads $w^3$ of said projections fitting in the recesses $w^4$ along the slots at the outer faces of the side bars. When the bar $W^2$ is removed from the slots $w'$ $w^4$ of the side bars, W' W', as in Fig. 10, the frame of bars W' W' $W^3$ may be positioned around the tree or pile to be cut, and the bar $W^2$ then will be connected with the bars W' W', and bolts $W^4$, passing through slots $w^5$ of the bar $W^2$, will be passed also through the slot $w^6$ of bar $W^3$, and the nuts $w^7$ of bolts $W^4$ will be tightened behind the bar $W^3$, so as to clamp the guide-frame firmly to the tree or pile to be cut to guide the cutter in its operation.

Instead of the long bolts $W^4$, short screw-bolts $W^5$ may be entered through the slots $w^5$ $w^6$ of bars $W^2$ $W^3$, and be screwed directly into large trees or piles at the front and rear, as shown in Fig. 2.

The side bars, W', of frame W may be of any preferred length; but the front and rear bars, $W^2$ $W^3$, will be of proper fixed length to enable the peripheral grooves $v'$ of the rollers V at opposite ends of the cutter E to run on the tongues V' at the upper edges of the side bars, W', of the guide-frame.

It is desirable to have some means for drawing the cutter through the tree or pile to be cut, and when a number of the arms, as at B C D, are employed, a convenient means for folding the arms together and upon the truck also is desirable, and I attain both these ends by means of ropes and a windlass, next described.

The letters X X indicate the ropes, which have fixed to them snap-hooks $x$ $x$ at their ends, adapted to be engaged with staples $x'$ $x'$ on the arms C C, and also have fixed hooks $x^2$ $x^2$, which may be engaged with the cross-bar $a^2$ of frame A', and the ropes lead to a windlass-barrel, X', journaled, as in Figs. 1 and 2, at the lower ends of uprights A², fixed to the truck A and suitably braced, and a belt, G², running from pulleys on the engine-shaft G, runs over pulleys on the windlass-shaft, the pulleys being fast and loose, and a belt-shifter is to be provided for shifting belt G² when the windlass is to be operated, and a suitable pawl and ratchet will be provided, as at X², for holding the windlass-barrel against running back.

When the truck A (shown in Figs. 8 and 9) is used, I will journal the windlass-barrel shaft in four standards, A², and provide a crank, X³, at the center of the shaft, so that the windlass may be turned by hand.

The operation is as follows: In felling trees the truck will be positioned so that the extended arms B C D may be placed at opposite sides of the greatest number of trees, and the cutter E then will be adjusted to the ends of the outer arms. The ropes X X then will be connected by snap-hooks $x^2$ with the head of frame A, and when the cutter-guide frame W is fixed to the farthest tree, T', and the cutter-guide wheels V V are adjusted to the frame W, the windlass X' may be operated to draw back the frame A', and with it the arms and cutter E, thereby feeding the cutter through the tree, which, having been cut down, the frame A' will be drawn in by the windlass until the opposite hooked ends of strong stay-bars M' may be engaged with the eyes or staples $m$ $m'$ on the uprights A² and frame A', respectively, as in dotted lines in Fig. 1, which will draw the cutter E back into approximate position for felling the next tree, T², to which a guide-frame, W, will be adjusted. The frame A' now being held by the opposite hook-bars M', the snap-hooks $x^2$ will be disengaged from the bars $a^2$ of the arm-frame, and the ropes X X will be drawn over pulleys M² M², journaled on bar $a^2$, and the windlass will be operated first to take up the slack of the rope X between the snap-hooks $x^2$ and the snap-hooks $x$, which latter hooks had been engaged with the staples $x'$, and then to draw on the arms by the hooks $x$ for feeding the cutter through the second tree, T², and when two or more trees which had been inclosed by the extended arms have been felled in this way the ropes X X may further be drawn upon by the windlass to fold the arms B C D together on the truck, to be supported by the hook-bars M' and the uprights A²; or, when the truck with engine is employed, as in Figs. 1 and 2, the bars M' may be removed to allow the arms to be supported by a cross-bar, A³, connecting and resting on the tops of the uprights A². The position of the truck then will be changed and the arms will again be let down by the aid of the windlass, and will be extended to inclose another line of the trees, and the work of felling them will proceed as above described. It is evident that the tree-feller will work equally well to cut timber at a higher or lower level than the truck.

Referring to Fig. 11, the numerals 1 indicate the derrick of a pile-driver to which a shaft, 2, is journaled, and on the outside of the journal-boxes of shaft 2, or by means of swivel-plates similar to those connecting the arms B C, and above described, are hung an opposite pair of arms, 3 3, through the lower ends of which passes a shaft, 4, which shaft also passes through swivel-plate bearings connecting the arms 3 3 to another pair of arms, 5 5, at the outer ends of which the cutter E is journaled. A belt, 6, from an engine or motor operating the pile-driver, and located, it may be, on the barge or float or other support, 7, leads to a pulley, 8, on shaft 2, which has pulleys 9 9, over which belts 10 10 pass to pulleys 11 11 on hollow shafts or sleeves supported by shaft 4, and over other pulleys thereat pass belts 12 12, which lead to pulleys on the opposite ends of the cutter E for operating it. After the pile 13 has been driven by the pile-driver in the ordinary manner, the guide-frame W will be applied to the pile, and the cutter E will be attached to the arms 5 5 outside of the pile and drawn back by taking hold of the shaft or bar 4 for cutting off the top of the pile; or, if desired, the cutter E may be pushed against the pile and cut its way through it as it is moved outward by taking hold of shaft 4, the arms 3 3 5 5 then swinging on their swiveling connections. When the pile is cut off, the cutter E may be detached, and the arms 5 5 may be raised up on the shaft 4 as a pivot and be latched in some secure way to the derrick, so as to allow easier adjustment of the derrick and be out of the way of the pile-driving mechanism.

When many piles are to be cut off, as in bridge and dock building, the truck A, with the series of arms B C D, either solid or hollow, may be employed, a track preferably being laid for the truck to run on upon the float 7, or any other floating or fixed platform or support.

It will be understood that in felling trees the cutter E may be pushed forward against and through the tree, as well as drawn backward while felling the tree, as hereinbefore described.

Throughout the machine, as arranged either for tree-felling or pile-cutting, the joints of the arm-frame are made with swiveling connections, which hinge the arms together and to their supporting-frame without binding on the shafts which carry the belt-pulleys; hence the shafts, pulleys, and belts will always work freely and without excessive friction.

Having thus described my invention, what I claim as new, and desire to secure by Letters Patent, is—

1. A tree-feller and pile-cutter comprising a central shaft or arbor provided with oppositely-arranged or right and left spirals with their meeting ends forming a cutter, together with belts and shafts and a suitable support, substantially as herein set forth.

2. In a tree-feller and pile-cutter, the central shaft or arbor having oppositely-arranged spirals with their meeting ends forming a cutter, said spirals also having cutters at intervals throughout their lengths, in combination with driving belts and shafts and a suitable support, substantially as herein set forth.

3. A tree-feller and pile-cutter comprising a movable truck or platform-support, a frame, A', pivoted thereto, a driving-shaft, $b$, on said frame, pulleys and belts for imparting motion to said shaft, one or more pairs of arms pivoted to frame A' and to each other, a rotatable cutter journaled at the ends of the outer pair of arms, and a system of pulleys and belts transmitting motion to the cutter from shaft $b$, substantially as herein set forth.

4. A tree-feller and pile-cutter comprising a truck or platform-support, A, a frame, A', pivoted thereto, a driving-shaft, $b$, on said frame, one or more pairs of arms pivoted to said frame and to each other, a rotatable cutter journaled at the ends of the outer pairs of arms, a system of pulleys and belts transmitting motion from shaft $b$ to the cutter, and shafts $f$, universally jointed to the ends of shaft $a'$, and provided with supports $f^2$ $f^3$ at the outer ends, and pulleys $f^4$, adapted to receive the driving-belt from a motor, substantially as herein set forth.

5. A tree-feller and pile-cutter comprising a movable truck or platform-support, A, a frame, A', pivoted thereto, a driving-shaft, $b$, on said frame, pulleys and belts for imparting motion to said shaft, one or more pairs of arms pivoted to frame A and to each other, a rotatable cutter journaled at the ends of the outer pair of arms, a system of pulleys and belts transmitting motion from shaft $b$ to the cutter, and a windlass fitted to the support A, and ropes leading therefrom to connect with the frame A', and the pivoted arms, substantially as herein set forth.

6. A tree-feller and pile-cutter comprising a support, A, a frame, A', pivoted thereto, pairs of arms pivoted to frame A' and to each other, a rotatable cutter journaled at the ends of the outer pair of arms, a system of pulleys and belts transmitting motion from a shaft, $b$, on frame A' to the cutter, a windlass arranged on the support A, ropes leading from the windlass and provided with snap-hooks $x$ $x^2$, or equivalent devices, and fixtures on the second pair of arms and on frame A', adapted to be engaged by the hooks $x$ $x^2$, substantially as herein set forth.

7. In a tree-feller and pile-cutter, the combination, with a series of arms connected to a support and pivoted to each other by short shafts, as at $c$ $d$, and pulleys and belts transmitting power through said shafts from a motor to a rotatable cutter journaled at the ends of the outer pair of arms, of brace or tie rods, as at R, connecting the shafts $c$ $d$, substantially as herein set forth.

8. A tree-feller and pile-cutter comprising a support, A, a frame, A', pivoted thereto, a driving-shaft on said frame, pulleys and belts for rotating said shaft, one or more pairs of tubular or hollow arms, as at B C D, pivoted to support A or frame A' and to each other, a rotatable cutter journaled at the ends of the outer pair of arms, and a system of pulleys and belts operating inside the tubular arms for transmitting motion to the cutter, substantially as herein set forth.

9. The combination, with adjacent arms and a shaft, as at $c$, carrying pulleys K L, and belts for receiving and transmitting motion along said arms, of swiveled plates provided with tongues $s$ and grooves $s'$, and a strap, T, having tongues $t$ $t$, adapted to the grooves $s'$ $s'$ of opposite swivel-plates, substantially as herein set forth.

10. The combination, with the tubular arms, as at B C, and a shaft, $c$, carrying belted pulleys K L, of caps B' C' at the ends of the arms, semicircular swiveled plates $B^5$ $C^5$ and $C^6$ $B^6$, provided with tongues $s$ and grooves $s'$ and fixed to the body parts and caps of the arms, and a strap, T, having tongues $t$ $t$, adapted to the grooves $s'$ of the swivel-plates, and half-boxes U' U', fixed to the body parts and caps of the arms for support of shaft $c$, substantially as herein set forth.

11. The combination, with the tubular arms, as at B C, and a shaft, $c$, carrying belted pulleys K L, of caps B' C' at the ends of the arms, semicircular swivel-plates $B^5$ $C^5$ and $C^6$ $B^6$, provided with hangers $s$ and grooves $s'$, and fixed to the body parts and caps of the arms, a strap, T, having tongues $t$ $t$, adapted to grooves $s'$ $s'$, half-boxes U' U', fixed to the body parts and caps of the arms, and half-brasses U U, fitted in the boxes and provided with projecting lugs $u^3$, entering recesses of the boxes, substantially as herein set forth.

12. The combination, with the tubular arms B D and single-belt pulleys, as at I Q, of semicircular caps fitted to the ends of the arms, and half-boxes U' U', fixed to the body parts and caps of the arms, and with or without re-enforcing plates $U^2$ $U^2$, substantially as herein set forth.

13. The combination, with the tubular arms B D and single-belt pulleys, as at I Q, of semicircular caps fitted to the ends of the arms, half-boxes U' U', fixed to the body parts and caps of the arms, and with or without re-enforcing plates $U^2$ $U^2$, and half-brasses U U, fitted to the driving-shafts of the pulleys and provided with projecting lugs $u^3$, entering recesses of the half-boxes U', substantially as herein set forth.

14. In a tree-feller and pile-cutter, the combination, with the extremities of the outer arms, and a rotatable cutter-head, and shafts and pulleys, as at $e$ Q, journaled in the arms, of heads $e^3$ on shafts $e$, said heads having tapering sockets to receive the tapering ends $e^2$ of the cutter-head shaft, and pins E', crossing said sockets and having conical parts $e^4$, entering transverse tapering openings in the cutter-head shaft, substantially as herein set forth.

15. In a tree-feller and pile-cutter, the combination, with the cutter-head, arms provided with belt-pulleys and belts, and mechanisms for driving said belts, substantially as specified, of wheels V, journaled to the arms and adapted to travel on a frame fixed to the tree or pile for guiding the cutter-head, substantially as herein set forth.

16. In a tree-feller and pile-cutter, the combination, with a cutter-head journaled at the outer ends of arms, as at D D, of a frame secured to the tree or pile to support and guide the cutter-head, substantially as herein set forth.

17. In a tree-feller and pile-cutter, the combination, with a cutter-head journaled at the outer ends of arms, as at D D, provided with wheels V V, of a frame secured to the tree or pile to support the arms by said wheels for guiding the cutter-head, substantially as herein set forth.

18. In a tree-feller and pile-cutter, the cutter-head guide-frame W, constructed with side bars, W' W', having slots $w$ $w^4$ $w'$ $w^4$, and front and rear bars, $W^2$ $W^3$, provided with slots $w^5$ $w^6$, respectively, and having ⊢-heads $w^2$ $w^3$, adapted to the slots of the side bars, in combination with bolts $W^4$ or $W^5$, passed through the slots to hold the frame to the tree or pile, substantially as herein set forth.

WILLIAM G. RENDALL.

Witnesses:
F. HENSHAW,
W. H. CONNER.